(12) United States Patent
Park

(10) Patent No.: US 6,804,775 B1
(45) Date of Patent: Oct. 12, 2004

(54) COMPUTER BOOTING METHOD

(75) Inventor: Jun-Kyung Park, Daeku (KR)

(73) Assignee: LG Electronics Inc., Seoul (KR)

( * ) Notice: Subject to any disclaimer, the term of this patent is extended or adjusted under 35 U.S.C. 154(b) by 557 days.

(21) Appl. No.: 09/672,442

(22) Filed: Sep. 28, 2000

(30) Foreign Application Priority Data

Sep. 30, 1999 (KR) ......................................... 1999-41927

(51) Int. Cl.[7] ............................................... G06F 9/24
(52) U.S. Cl. ............................................ 713/2; 713/100
(58) Field of Search ..................................... 713/2, 100

(56) References Cited

U.S. PATENT DOCUMENTS

| | | | | |
|---|---|---|---|---|
| 5,274,816 A | * | 12/1993 | Oka ............................... | 713/2 |
| 6,035,395 A | * | 3/2000 | Saito .............................. | 713/1 |
| 6,105,130 A | * | 8/2000 | Wu et al. ....................... | 713/2 |
| 6,282,641 B1 | * | 8/2001 | Christensen ................... | 713/2 |
| 6,292,890 B1 | * | 9/2001 | Crisan ........................... | 713/2 |

OTHER PUBLICATIONS

IBM Technical Disclosure Bulletin, "Boot Path Verification and Override", vol. 42, Issue 418, Feb. 1, 1999.*
Kevin Marty, "AutoEject for Windows 95 and Windows NT4.0—Readme.txt", Version 1.22, Jun. 27, 1997.*
Phoenix Technologies Ltd., "BIOS Enhanced Disk Drive Specification", Version 3.0, Rev. 0.9, Apr. 20, 1998.*
A. Padgett Peterson, "NoFBoot.doc", 1991.*

* cited by examiner

Primary Examiner—Thomas Lee
Assistant Examiner—Albert Wang
(74) Attorney, Agent, or Firm—Fleshner & Kim, LLP

(57) ABSTRACT

A computer booting method includes the steps of: judging whether there is a CD in a booting mode when a computer is powered on; ejecting the inserted CD according to the judgement; changing a booting medium of the computer, setting a predetermined booting sequence in the changed medium and driving the medium for booting the computer. With this method, when the computer is powered on, even though the bootable CD is mounted in the CD driver, the user can selectively controls booting by the CD, so that the computer is prevented from undesirable booting by the CD.

11 Claims, 3 Drawing Sheets

COMPUTER BOOTING METHOD

BACKGROUND OF THE INVENTION

1. Field of the Invention

The present invention relates to a method for selecting a booting mode of a computer, and more particularly, to a computer booting method which is capable of selectively performing booting by a compact disk when a computer is turned on.

2. Description of the Background Art

FIG. 1 is a flow chart of a computer booting process in accordance with a conventional art.

A computer booting process of the conventional art will now be described with reference to FIG. 1.

In a state that a bootable CD is inserted in a compact disk driver installed in a computer, when a user presses a POWER-ON button provided at a computer main body, a hardware is initialized by a bios according to a medium booting sequence set in the bios. In this respect, the booting sequence refers to booting movement from a CD-ROM to a hard disk.

Thereafter, booting is performed with the computer by reading a booting file recorded in the CD inserted in the CD driver.

In case that the user desired to perform booting the computer by using a hard disk, rather than by using the CD, he or she should take out the CD inserted in the CD driver to re-boot the computer.

Meanwhile, an eject button is installed in most CD drivers to eject the inserted CD. Thus, though the medium booting sequence is set to preferentially boot the computer by using the CD, if the user desires to boot the computer by using the hard disk, he or she may press the eject button to eject the CD from the CD driver immediately after the computer is powered on or during a bios program.

That is, while the computer is being booted by the CD inserted in the driver, it can be also booted by using the hard disk.

However, in most cases, users do not recognize the fact that there is the bootable CD in the CD driver until the compute starts booting by the CD. In this case, since the computer has been already started booting by the CD, if the user does not want to boot the computer by the CD, he or she should eject the CD after the booting is completed and re-boots the computer by using the hard disk.

Also, in case that the CD inserted in the CD driver is a music CD carrying pieces of music, the music of the CD is automatically reproduced according to the auto play after the computer is booted by the hard disk. Therefore, if the user does not want the recorded music to be reproduced, he or she should interrupt reproducing, which causes users' inconvenience to perform a desired operation as well as time consumption.

In addition, in a state that the computer has been undesirably booted by the bootable CD inserted in the CD driver, if the user mistakenly executes an install program of the CD, an undesired program is installed in the hard disk. Then, since the user should delete the installed program, an unnecessary time delay is caused.

SUMMARY OF THE INVENTION

Therefore, an object of the present invention is to provide a computer booting method which is capable of setting a booting mode of a computer according to a specific key input within a certain time as the computer is powered on.

To achieve these and other advantages and in accordance with the purpose of the present invention, as embodied and broadly described herein, there is provided a computer booting method including the steps of: judging whether there is a CD in a booting mode when a computer is powered on ejecting the inserted CD according to the judgement; and changing a booting medium of the computer, setting a predetermined booting sequence in the changed medium and booting the computer.

To achieve the above objects, there is also provided a computer booting method including the steps of: identifying whether a previously designated specific key is inputted when a computer is powered on; designating a booting mode of a computer based on the order of a bios according to the input of the specific key, or designating a booting mode of the next medium, excluding a CD booting mode; and setting a predetermined booting sequence corresponding to the designated booting mode and booting the computer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
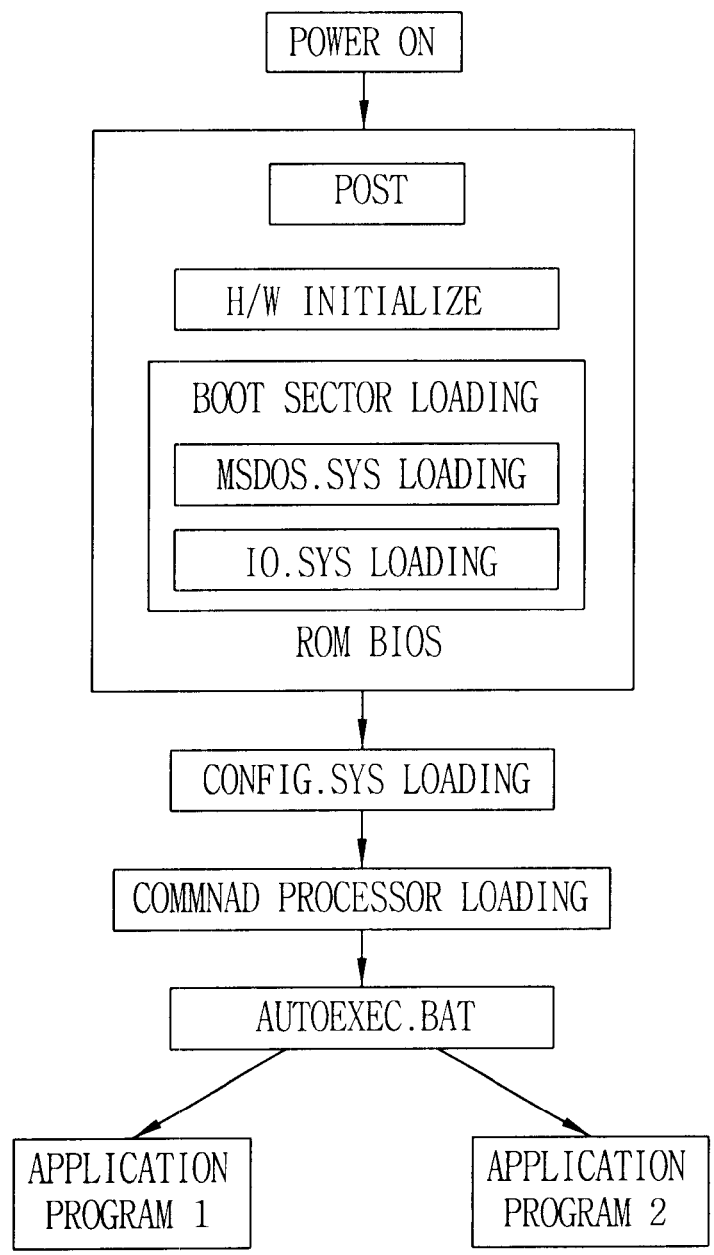
FIG. 1 is a flow chart of a computer booting process in accordance with the conventional art.
Figure 2:
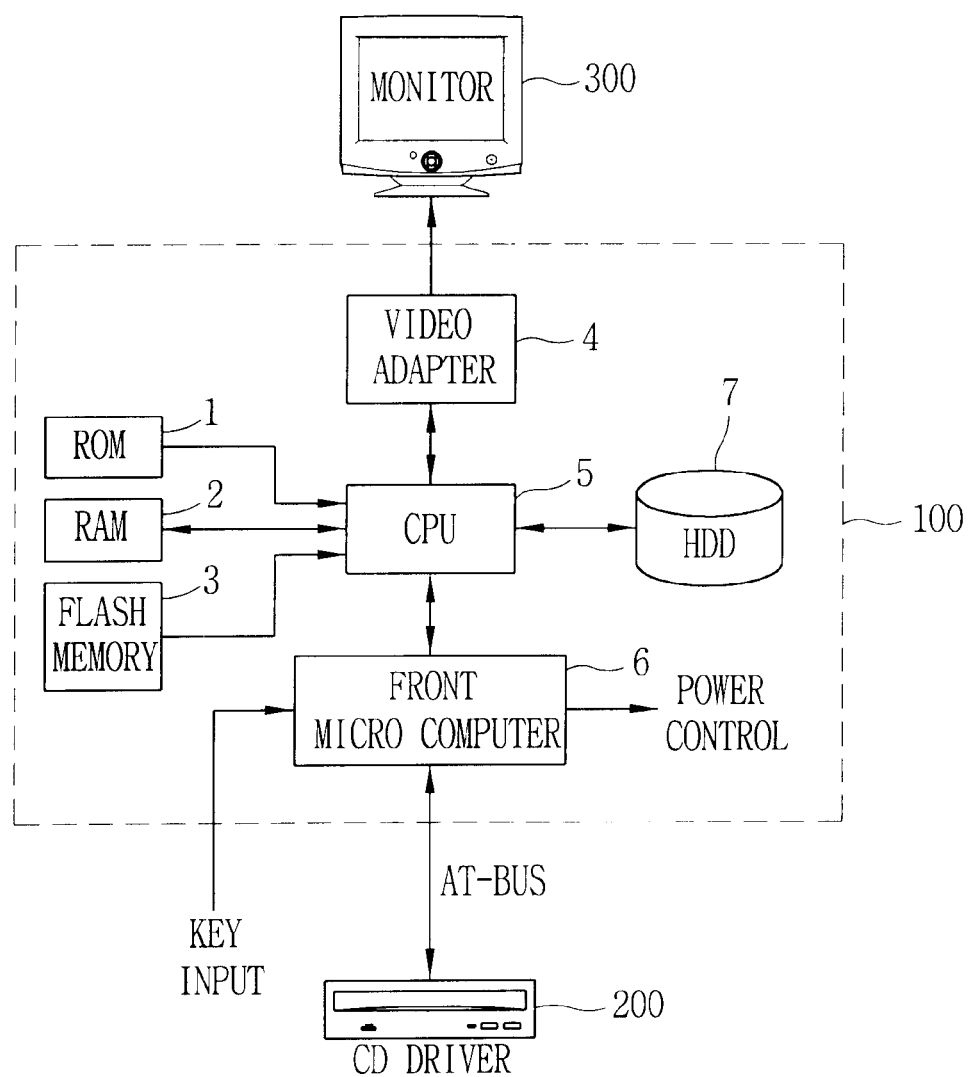
FIG. 2 is a shematic block diagram showing a construction of a computer implementing the computer booting method and a monitor and a CD driver connected to the computer in accordance with the present invention.

FIG. 2 is a schematic block diagram showing a construction of a computer implementing the computer booting method and a monitor and a CD driver connected to the computer in accordance with the present invention.

As shown in the drawing, the computer includes a CD driver 200 connected to a computer 100 that receives a key input; a front microcomputer 6 for transmitting and receiving an instruction; a ROM 1 for storing a bios program and a data; a CPU 5 for performing a program stored in the ROM 1 and the hard disk (HDD) 7 to control the whole system; a RAM 2 for writing and reading a desired data; a flash memory 3 for storing a recorded data even if power supply is cut off with the system; and a video adapter 4 for converting the data stored in the RAM 2 to an image signal and outputting the image signal to a monitor 300.

The operation of the above construction as described above will now be explained.

First, when the computer is powered on, it is judged whether a CD has been mounted in the driver in the booting mode.

Upon judgement, in case that there is a CD in the driver, the CD mounted in the driver is ejected.

Thereafter, the booting medium of the computer is changed and a designated environment is set in the changed medium, so that the medium is driven to boot the computer. That is, the computer is booted in a hard disk mode, rather than in a CD mode.

In this case, however, even if the user desires to boot the computer by the CD, since the CD is forcibly ejected by a specific key, booting by the CD is not possibly performed. Thus, a method for preventing the CD from forcibly ejecting will now be described with reference to FIG. 3.

Figure 3:
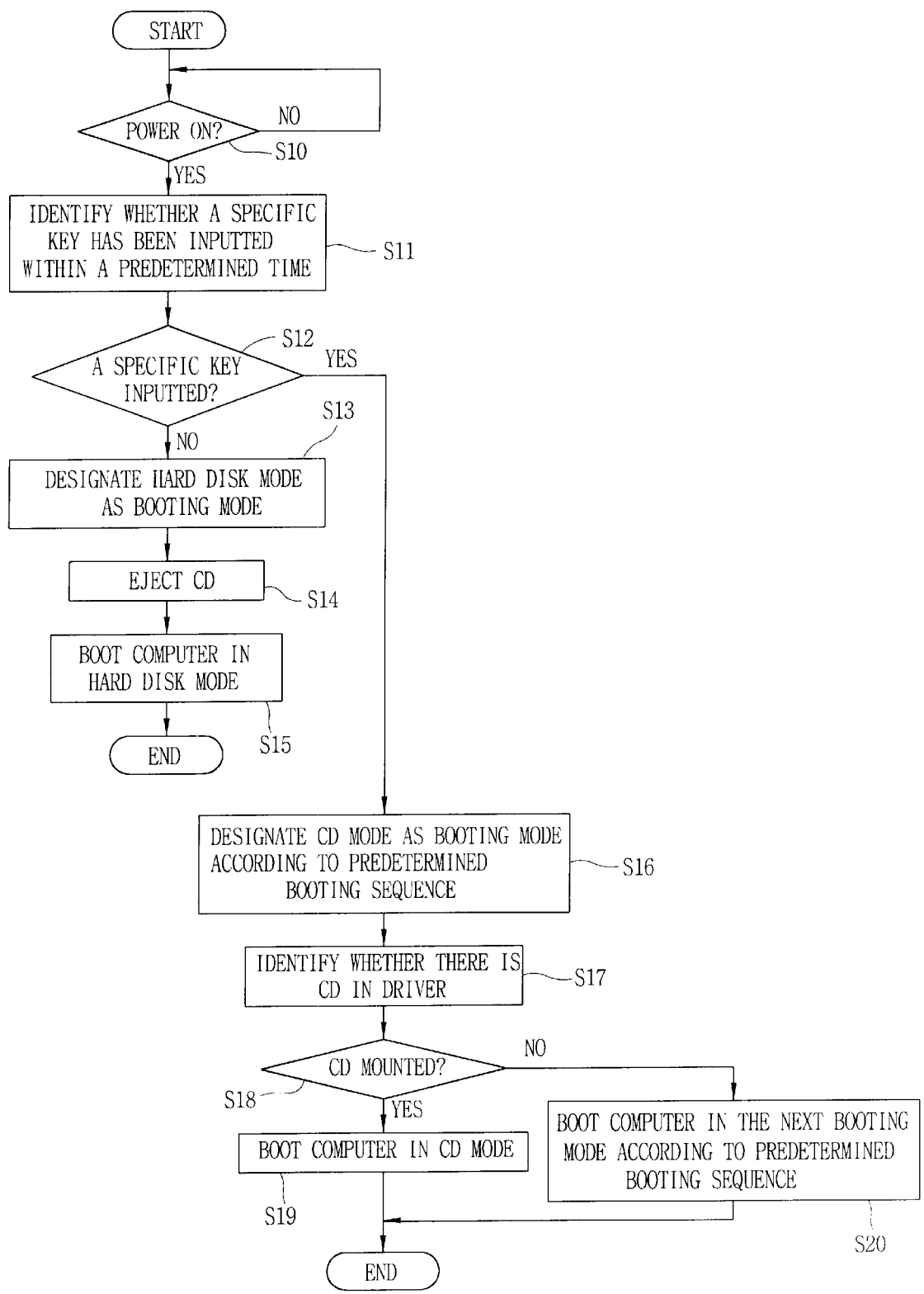
FIG. 3 is a flow chart of a computer booting method in accordance with the present invention.

FIG. 3 is a flow chart of a computer booting method in accordance with the present invention.

First, the bios of the ROM 1 refers to a program and a sub-program of an operating system that controls the computer and peripheral devices. That is, it's a collection of a basic computer routine including an interface of the lower-most level to adjust the common devices such as a system clock, a video display, a disk driver or a key board.

Accordingly, the booting sequence of the system memory medium used by the bios is set. However, in the following description for a computer booting method, it is assumed that the booting sequence of the medium is set sequentially from the CD-ROM to a hard disk.

In case that a booting sequence has been set from a hard disk, not the CD-ROM, when the user presses a power button prepared on the computer main body in order to boot the computer, the front microcomputer 6 controls power supply to apply power to each element according to the input of the power button.

That is, the front microcomputer (6) controls power supply, so that the system is powered on and the ROM 1 bios performs POST. In this respect, the POST is a serial checking process to check the state of each device of the computer system and perform initializing so as for the computer system to be operated, as power is applied to the computer. Namely, the POST refers to a self-checking after power is applied to the computer.

Generally, IBM PC includes the POST inside the ROM bios, and whenever the computer is turned on or whenever the system is reset, the POST is executed to check the state of each part of the computer system to report state information and error information.

Accordingly, the POST performing checking the CPU 5, the RAM 2, the flash memory 3 and other devices, initializing the hardware and internal device drivers.

After the power is supplied to system, the CPU 5, that performs the bios program, identifies whether a specific key is inputted within a predetermined time (S11). In this respect, the pre-set specific key refers to a single key, such as 'Esc', on a key board (not shown) connected with the computer. The predetermined time is shorter than the time taken until the computer 100 starts booting in a designated mode after power is applied to the system.

Thereafter, the CPU 5, performing the bios program, judges whether the booting mode of the computer is to be designated as a CD booting mode according to the set booting sequence or to be designated as a hard disk booting mode, that is, the next medium booting mode, excluding the CD booting mode according to the key input of a pre-set specific key within a predetermined time (S12).

If no pre-set specific key (i.e., 'Esc' key) is inputted within a predetermined time, the CPU 5 designates the booting mode of the computer as a hard disk booting mode, that is, the booting mode of the next medium, excluding the CD booting mode, rather than designating the CD booting mode according to the booting sequence as set in the system memory (S13).

As state above, in order to boot the computer by designating a hard disk booting mode, not the CD booting mode, CPU 5 transmits an 'ATA' command requesting an ejection of the CD through the front microcomputer 6 to the CD driver 200. Accordingly, the CD driver forcibly ejects the inserted CD by opening its internal door (S14).

And then, the CPU 5 performs a bios program of the next routine. The bios of the next routine identifies the current medium booting sequence, and if it is in the CD booting mode, the bios of the next routine checks whether there is a CD mounted on the CD driver 200. In this respect, however since the CD has been ejected, the hard disk booting mode is proceeded to perform booting (S15).

As described above, in order to perform booting by proceeding to the hard disk booting mode, a boot loader (not shown) of the bios loads a booting program of the hard disk 7 to the RAM 2. The booting program executes 'CONFIG.SYS' file, that is, a system driving file, of the hard disk 7 to initialize related variables and store every application device drivers as installed in the RAM 2 and initialize them.

Also, the booting program executes 'AUTOEXEC.BAT', that is, an automatic executing batch file, to load programs existing in various memories and designates every related variable to execute a program.

When the initialization condition designating file group is completely executed according t o the designated booting mode, the booting program reads out initialization setting files such as 'SYSTEM.INI' of the file group for driving program and executes to complete booting.

As mentioned above, booting can be performed by the hard disk in a manner that after a command for ejecting the CD is transmitted to the CD driver 200, the hard disk booting mode, the next medium booting mode, is designated to perform booting by the hard disk, neglecting the CD booting mode in the current medium booting sequence, instead of performing booting according to the conventional booting process.

Meanwhile, in the step of judging whether the hard disk booting mode is to be designated, in case that a pre-set specific key is inputted within the predetermined time (S12), the CPU 5 designates the CD booting mode according to the booting sequence as set in the system memory, rather than intentionally changing the booting mode of the computer (S16). Accordingly, the CPU 5 that performs the bios program identifies whether there is a CD in the CD driver (S17).

Thereafter, it is judged whether there is a CD in the CD driver (S18).

Upon judgement, in case that there is a CD in the CD driver 200, the boot loader of the bios is performed. That is, the boot loader requests transmission of a booting program existing on a specific track of the CD mounted in the CD driver 200 and loads and performs it upon receipt of it, thereby booting the computer by the system file of the bootable CD (S19).

In the step S18, upon judgement, if there is no CD in the CD driver 200, the hard disk booting mode, the next booting mode, is performed according to the predetermined booting sequence to perform booting (S20).

As so far described, according to the computer booting method of the present invention, when the computer is powered on, even though the bootable CD is mounted in the CD driver, the user can selectively controls booting by the CD, so that the computer is prevented from undesirable booting by the CD.

In addition, such problem as in the conventional art that after the computer is booted by the bootable CD inserted in the CD driver, contrary to the user's intention, an install program of the CD, not desired by the user, is executed and installed in the hard disk, Then, since the user should delete the installed program, an unnecessary time delay is caused.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A computer booting method comprising:
   checking whether a booting driver is a disk driver;
   judging whether there is a disk mounted in the disk driver in a booting mode state;
   ejecting the disk in the booting mode state according to the judgment; and
   performing a booting mode in a changed booting medium according to the disk ejection.

2. The method according to claim 1, wherein in the ejecting the disk, the disk is restrained from ejecting according to input of a specific key that is previously determined.

3. The method according to claim 2, wherein in case that the specific key is inputted, a disk booting mode is set according to a predetermined booting sequence, and then the disk booting mode is performed depending on whether the disk is mounted in the disk driver.

4. The method according to claim 1, comprising setting a booting sequence for controlling a booting medium, wherein the booting sequence has the disk driver as a first booting medium.

5. The method according to claim 1, wherein the changed booting medium is a hard disk.

6. The method according to claim 2, comprising setting a booting sequence for controlling a booting medium, wherein the booting sequence has the disk driver as a first booting medium.

7. A computer booting method, wherein a booting driver is set to a disk driver, comprising:
   judging whether there is a disk mounted in a disk driver in a booting mode state;
   ejecting the disk in the booting mode state according to the judgement; and
   performing a booting mode using a next booting medium according to the disk ejection and a booting sequence.

8. The method according to claim 7, comprising:
   identifying whether a prescribed key has been input within a prescribed time; and
   designating a disk mode as an override booting medium, wherein the booting mode using the override booting medium comprises,
      judging whether the disk is mounted in the disk driver in the booting mode state,
      using the mounted disk to boot the computer, and
      performing the booting mode using the next booting medium when the disk is not mounted.

9. A computer booting method, comprising:
   judging whether there is a disk mounted in a driver in a booting mode state;
   ejecting the disk in the booting mode state according to the judgment; and
   directly performing a booting mode in a changed booting medium according to the disk ejection.

10. The method according to claim 9, wherein the directly performing the booting mode is completed without user action.

11. The method according to claim 10, comprising setting a booting medium to the disk driver before the judgment of whether the disk is mounted in the driver.

* * * * *